Nov. 3, 1931.   C. A. RUDQVIST   1,830,564
POWER TRANSMISSION
Filed Dec. 2, 1929   2 Sheets-Sheet 2

INVENTOR
Carl August Rudqvist
BY
his ATTORNEY

Patented Nov. 3, 1931

1,830,564

UNITED STATES PATENT OFFICE

CARL AUGUST RUDQVIST, OF STOCKHOLM, SWEDEN, ASSIGNOR TO PULVIS AKTIEN-GESELLSCHAFT, OF GLARUS, SWITZERLAND, A CORPORATION OF SWITZERLAND

POWER TRANSMISSION

Application filed December 2, 1929, Serial No. 411,029, and in Sweden March 15, 1928.

This application is filed to replace my copending application Serial No. 377,478, which is a division of application Serial No. 278,271, filed May 16th, 1928, and to replace my copending application Serial No. 401,353, filed October 21st, 1929, and is to be considered as relating back, for common subject matter, to the respective filing dates of all of the aforesaid applications and to the rights incident thereto.

My invention relates to power transmission. More particularly my invention relates to clutches for coupling a rotary driving member to a member to be driven rotationally at the same speed. In one important phase of the invention, it relates to overload releasing of power transmitting mechanisms, particularly where the driving member is of constant running speed.

Amongst the objects of my invention are: To transmit power to a member to be driven without having a high starting load on the motor; to provide a clutch for accelerating a driven member having initial slippage to give smooth connection without slippage in direct drive; to provide such a clutch which releases or breaks on overload; to provide a clutch which releases at a given value of overload for a given speed; to provide a clutch which transmits but little power initially and which gradually comes up to direct drive condition; to provide a clutch which releases on overload but which can pick up again when the overload ceases without stopping and without manual intervention; to provide a clutch which can readily be adjusted to release at various selective values of load for a given speed; to provide a clutch, the starting characteristics of which can be varied to suit conditions of operation; to provide a clutch which operates with equal efficiency in either direction of rotation; and to provide a clutch combining the features above mentioned.

My invention consists in a new method of transmitting power and apparatus therefor. The method makes use of internal friction of a mass of dry comminuted material or powder. By "dry", as herein used is meant a condition wherein the mass of particles has an appreciable coefficient of internal friction. Such condition is not obtained when a powder is mixed with lubricating oil. However, it does exist when, for example, steel powder is mixed with powdered graphite, although graphite is, in a sense, a lubricant. As one example of such dry material, I use steel powder and graphite in the proportion of 99% steel powder and 1% graphite. I treat a mass of dry powder in such a way as to cause it to be stirred or agitated to permit relative movement of driving and driven members and then subject it to centrifugal force to increase the internal friction of and to pack the mass so that it becomes a fixed body. This fixed body becomes the force transmitting member between the driving and driven members. I utilize this packed mass as the sole force transmitting agency.

A power transmitting mechanism in accordance with the invention is of particular advantage in conjunction with electric motors. Electric motors run best at given speeds. The average electric motor, for example, a squirrel cage type motor, operates normally at a fixed speed. One of the greatest problems with such electric motors is to get them up to speed. Suppose, for example, that an electric motor of the squirrel cage type is direct connected to a pump. When the motor and pump are started, the motor has but little torque and the pump affords great resistance. Either the motor must be specially constructed to take care of this feature or the pump must be unloaded; or else there is a disadvantageous overload on the motor. The amperage rate required to bring a motor so connected up to speed may be many times the amperage rate for normal running.

Devices have been proposed for overcoming this difficulty, but such devices have been essentially purely mechanical in nature in that they have utilized the surface friction of parts capable of relative movement, in contrast to my method of utilizing the internal characteristics of a mass of fine divided solid material. The advantages of my method are many, including: minimum wear of parts; definite and positive release at a fixed value of overload; smooth starting without overload on the motor, and others as will appear.

I utilize a homogeneous mass, or substantially homogeneous, the internal friction of which is constant for similar conditions and, since the packing of the material depends on centrifugal force and centrifugal force varies as the square of the speed of revolution, and since a given amount of material assumes a certain shape under given conditions, a given structure with a given amount of material of given nature will always slip or release at the same value of force (or substantially the same) applied for the same speed. Thus I provide a positive and definite overload release combined with light load starting without special motor windings or appliances or unloading devices.

The invention will be explained more in detail in the following description, reference being had to the accompanying drawings forming part of this specification which illustrate the invention in principle and one apparatus embodying the invention.

Referring to the drawings.

Assume that we have a pile or mound of a limited amount of finely divided dry material of homogeneous nature. For example, let us consider the substance to be small metal balls of, let us say, ten thousands of an inch in diameter. Assume that the pile has been shoveled up so that it takes up the minimum of floor space. The side or sides of the pile will be of a definite straight line. The angle of this line, measured with relation to a horizontal plane, is fixed for a given material. It is called the angle of repose.

The fixed character of the angle of repose is due to internal friction of the material as acted upon by gravity; that is, the surface friction between particles. Gravity pulls all the particles downwardly against each other. As they are pulled downwardly they slip sideways on each other so long as the gravity force overcomes the vertical component of the friction between the particles.

Figure 1:
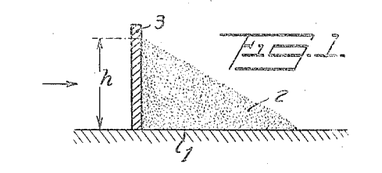
Fig. 1 is a diagrammatic illustration having reference to the principle of the invention.

Now, referring to Fig. 1, suppose a wall or abutment 3 is moved against such a pile or mound resting on a surface 1. The wall, with sufficient force applied, may push the mound into a drift 2 as shown in Fig. 1. The mass of particles offers a resistance to movement of wall 3 against the same. The amount of this internal resistance depends on the amount of material, its specific weight and its internal surface friction (assuming that the friction of the material against the horizontal surface is greater than the internal friction). Although wall 3 moves the mass 2, when the parts are at rest the angle of repose is the same. Assuming a static condition, as shown in Fig. 1, the powdered mass exerts a pressure against wall 3 because gravity tends to pull the vertical side of the drift down to the angle of repose. Consequently it is necessary to apply force to wall 3 to hold it in vertical position.

Figure 2:
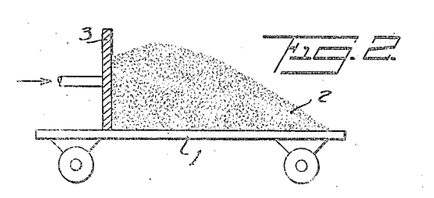
Fig. 2 is a second diagrammatic illustration of similar nature.

Now assume, as shown in Fig. 2, that the surface 1 is movable and that the wall 3 is moved from the left toward the drift and just above surface 1 so that it does not touch the carriage of which surface 1 is a part. At first, when the wall 3 just touches the edge of the pile, there will be no resistance. The wall will then push the material together to form the drift as shown in Fig. 2 until the drift gives so much resistance that the carriage moves.

This resistance varies with the amount of the material 2. Since the angle of repose is constant, the quantity varies as the height $h$ (Fig. 1). This resistance can also be varied by varying the specific weight of material 2. If the mass is subjected to centrifugal force acting in the same direction with respect to a moving mass as gravity with respect to a static mass, the effect is obtained of increased specific weight. With considerable centrifugal force, a very small amount of material can be made to give this resistance to the same degree as a very large mass at rest.

So my method contemplates forming a drift of powdered material by moving a wall or abutment against the mass of the material and then packing the mass by centrifugal action to obtain a great amount of resistance with a small amount of material. I transform the pliable mass into a fixed mass so that the driving and driven members move together. Furthermore, I do not clamp the driving and driven members because the mass gives a positive release in case of overload. If the load becomes great enough to overcome the internal friction or resistance built up in the drift, the drift merely becomes loose. I use only a limited amount of powdered material so that, when the internal friction is overcome and the fixed drift is disrupted, the resistance drops to a relatively low value so that there is a minimum of drag.

I will now explain a preferred apparatus for carrying out this method.

Figure 3:
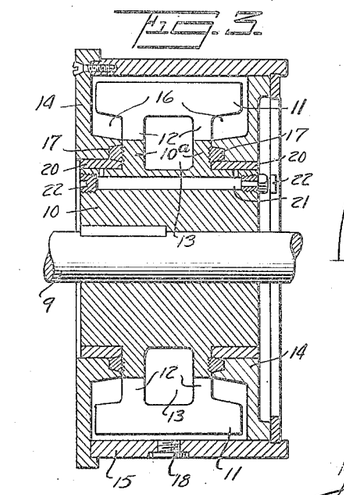
Fig. 3 is an axial cross-sectional view of a preferred form of apparatus embodying the invention.
Figure 4:
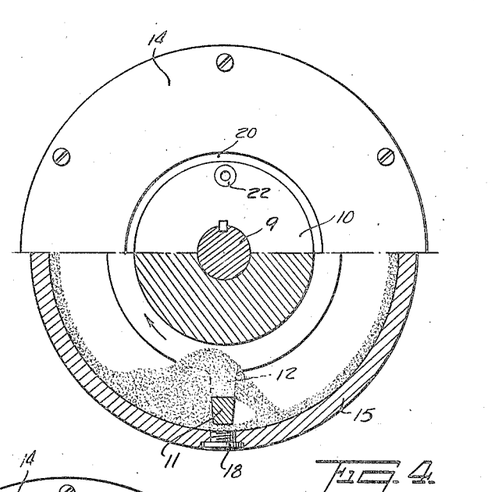
Fig. 4 is in part an end view and in part a transverse cross-sectional view of the apparatus showing one condition of operation.
Figure 5:
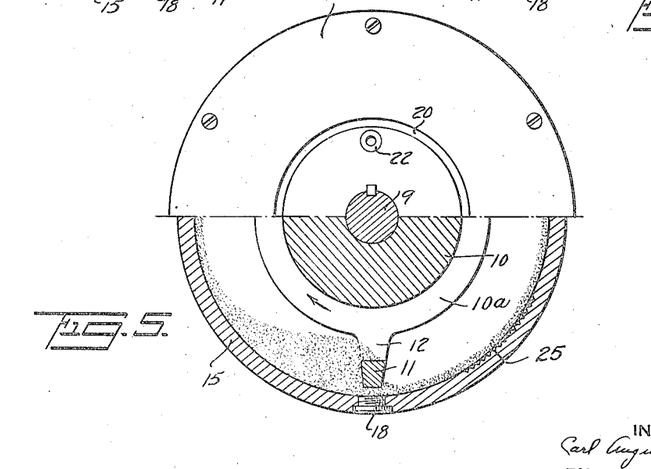
Fig. 5 is a view similar to that of Fig. 4 showing another condition of operation.

Referring to Figs. 3, 4 and 5, reference character 10 designates a hub secured to the driving shaft 9. Hub 10 advantageously comprises two axially spaced radially extending flange portions 10a. Connected with the flange portions 10a of hub 10 by means of arms 12 are two diametrically opposed blades 11. Blades 11 extend axially. The axially extending sides of each blade are substantially straight but taper toward each other, being closer at the outside axial edge. Openings or apertures 13 are formed between arms 12 and between the blades and the hub.

A drum 15 having end walls 14 is rotatably mounted on hub 10. The blades 11 are within drum 15. The axially extending outside surfaces of blades 11 are close to but spaced from drum 15 and the end edges of blades 11 are close to but spaced from end walls 14. Spaces or recesses 16 are formed between arms 12 and end walls 14.

In order to form a tight joint between hub 10 and drum 15, annular packing members 17 are provided between the rim portion of the hub and the end walls of the drum. I prefer to place these packing members in the position shown between the end walls of the drum and that part of the rim portion of the hub comprising the axially outer sides of the flange portions 10a. In the outside of drum 15 is a port 18 closed by a screw plug. This port serves to place the comminuted solid material inside the drum. Various substances may be used but I prefer steel powder. The powder should be finely divided and I believe that the best results are obtained if the size of the particles of the powder is less than 1% of the diameter of the clutch. I have found it advisable to add some graphite to the steel powder to protect the surfaces of the steel granules. I believe the size of the steel granules should be from 5 to 20 thousands of an inch in diameter. The amount of graphite added may vary but I prefer not over 5% of graphite to steel powder.

The driven member is connected to drum 15 as by a belt. So far as the clutch itself is concerned, hub 10 and blades 11 may be considered as the driving member and drum 15 as the driven member. Reference character 20 designates bearing rings between the driving and driven members of the clutch and reference character 21 designates an oiling passage closed by plugs 22.

Figure 6:
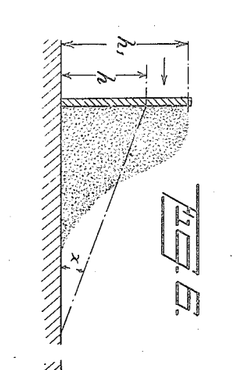
Fig. 6 illustrates a condition of internal mass movement incident to the invention.

The operation of the power transmitting mechanism is as follows:

When the device is at rest, the powder is in the lower part of the drum. When the driving member is rotated, blades 11 move through the powder carrying it along in the direction of rotation. As stated, the drum is only partially filled, so that the blades move readily through the powder without much resistance. The powder will be piled up in drifts in front of the blades. Since the blades are moving but the drum is not, or begins to move slowly, the height of the drift formed will be high, as indicated by $h_1$ in Fig. 6, in contrast to the height $h$ corresponding to the angle of repose. This will result in the drift rising to a height greater than the radial extent of the blade, as shown in Fig. 4, so that the powder will pass through the openings 13 and 16.

Figure 7:
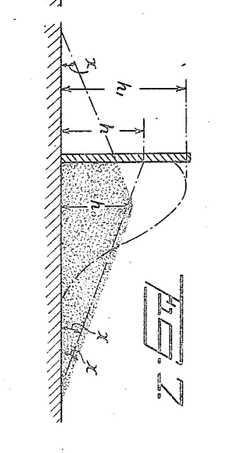
Fig. 7 illustrates a fixed condition of mass incident to the invention.

The powder is highly agitated to begin with and, as it is carried around, falls back to the lower part of the drum until such time as the powder is caused to rotate by the blades at a speed sufficient to build up centrifugal force in the powder to a degree overcoming the force of gravity. There is sufficient resistance, however, to cause drum 15 to start moving and to accelerate. Centrifugal force acting on the powder tends to pack it in drifts in front of the blades so that the resistance is increased and drum 15 moves faster. This continues until the drifts, under the influence of centrifugal force, have become in effect solid masses adhering to the driven member and providing abutments against which the blades act to drive the driven member at synchronous speed with the driving member. This condition is shown in Fig. 5 and Fig. 7. The top of the drift (at height $h_0$) is forward of the blade 11 and the angle is the same on both sides of the drift.

In direct or synchronous drive, balance exists between the driving torque of the driving member and the resistance of the powder. Balance requires an equalization of distribution of the powder which is obtained by the use of similar and symmetrical narrow blades, as shown, providing openings 13 and 16 through which the powder may pass. Balance also exists between the load torque acting on the drum and the torque due to the friction between the powder and the drum. With some substances, it is preferable to corrugate the inside drum surface as shown at 25 to ensure a greater effective friction between the drum and the powder than the internal friction of the powder.

For a given speed, the powder charge of the clutch will remain static so long as the force transmitted is below a given value. Above such given value, the internal static friction of the powder is overcome and the drifts are disrupted in shear. The friction of the mass then changes from static friction to kinetic friction which is of much lower value. The drift then grows in height. The operation in reestablishing drive after overload release and upon cessation of overload is substantially identical with what has been above described in connection with starting.

As above explained, the release or slipping force is constant or substantially constant for given speed with a given amount and kind of powder. The overload release value can be readily changed by increasing or decreasing the amount of powder charge. So by merely removing or adding more or less powder through port 18, a person can select any value of overload, within limits, for a given clutch. The more powder, the higher the drift and the greater the aggregate internal friction.

Figure 8:
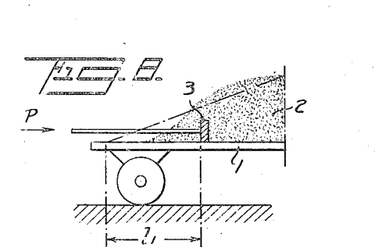
Fig. 8 illustrates a feature of the preferred form of apparatus embodying the invention.
Figure 9:
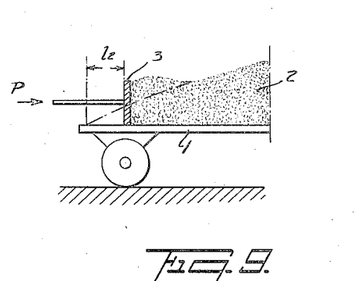
Fig. 9 is similar to Fig. 8 illustrating a difference of action due to difference in height of an abutment member.
Figure 10:
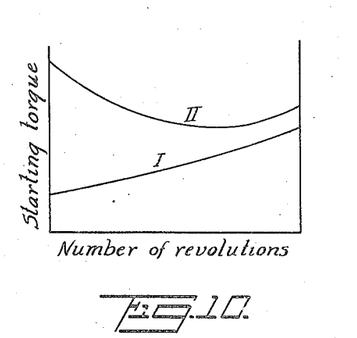
Fig. 10 shows two curves of starting torque for different apparatus.

I also propose to vary the starting characteristics. This can be done in the design of the clutch by varying the radial extent of blade 11. This radial extent makes considerable difference in starting as is illustrated by Fig. 8 and Fig. 9. Each of these figures shows the movable support 1 carrying a powdered mass 2. In Fig. 8, the driving element or blade 3 is of low height. In Fig. 9, the element 3 is high. It will be seen that, with the same accelerating force, the blade element 3 of Fig. 8 will travel farther into mass 2 than the higher blade element of Fig. 9 before sufficient resistance is built up to give the speed corresponding to direct drive. That is, the distance $l_1$ is greater than $l_2$ and the period of acceleration is longer in the first case than in the second. It will be seen that the starting will be smoother with a narrow blade element as in Fig. 8 than with a wide blade element as in Fig. 9. It will also be seen that different starting characteristics can be obtained by using different heights of blades. Obviously the operative height of the blade is dependent on the quantity of powder used. By using a blade of small height it is possible to obtain a starting torque of substantially continuous rise, as shown by curve I of Fig. 10; whereas by the use of a higher blade a starting torque may be obtained which first drops and then rises as shown by curve II in Fig. 10.

It will be seen that equalization of distribution of the finely divided material to balance the clutch is obtained due to the fact that at different axial distances from the axis of rotation the driving member provides surface of different axial extent with respect to the axial extent of the chamber at corresponding distances from the axis of rotation. This difference in axial extent in the form of clutch illustrated results from the provision of ports 13 and recesses 16 which constitute openings or apertures permitting movement of some of the material past the blades to effect the desired equalization of distribution.

While I have described one form of apparatus for performing my new method, it will be understood that other apparatuses may be used for carrying out the method and that I am neither to be limited to the specific apparatus described nor to the specific features of the method set forth. It will be realized that, amongst other changes, the number of driving blades may be varied. While I prefer two blades, one or more may be used without departing from the spirit or scope of the invention.

What I claim is:

1. The method of transmitting power between a driving member and a driven member having a mass of finely divided solid material of appreciable coefficient of internal friction disposed with relation to the driven member so as to be carried thereby, which comprises projecting into the mass a relatively narrow driving element so as to form a drift of the mass higher than the width of the driving element and thereby moving the mass and the driven member, generating centrifugal force due to movement of the mass to increase the internal resistance thereof and thereby causing the mass to become rigid and to drive the driving and driven members synchronously and transmitting power at synchronous speed solely through the mass so treated.

2. The method of transmitting power between a driving member and a driven member having a mass of finely divided solid material of appreciable coefficient of internal friction disposed with relation to the driven member so as to be carried thereby, which comprises projecting into the mass a relatively narrow driving element so as to form a drift of the mass higher than the width of the driving element and thereby moving the mass and the driven member, generating centrifugal force due to movement of the mass to increase the internal resistance thereof and thereby causing the mass to become rigid and to drive the driving and driven member synchronously and transmitting power at synchronous speed through the mass so treated.

3. The method of transmitting power between a rotary driving member of constant speed type and a rotary driven member having a mass of finely divided solid material of predetermined quantity and of appreciable coefficient of internal friction disposed with relation to the driven member so as to be carried rotationally thereby, which comprises projecting into the mass a relatively narrow driving element so as to form a drift of the mass higher than the width of the driving element and thereby gradually accelerating the mass and the driven member, generating centrifugal force due to movement of the mass to increase the internal resistance thereof and thereby causing the mass to become rigid and to cause the driving and driven members to move synchronously, transmitting power at synchronous speed solely through the mass so treated and utilizing the predetermined quantity of the mass to provide positive overload release upon application of an overload force of substantially fixed value.

4. The method of transmitting power between a rotary driving member of constant speed type and a rotary driven member which comprises disposing a mass of finely divided solid material having an appreciable coefficient of internal friction with relation to the driven member so as to be carried rotationally thereby, moving the driving member in contact with the mass to create a drift and thereby gradually accelerating the mass and the driven member, generating sufficient centrifugal force due to movement of the mass to increase the internal resistance thereof due to such force to a value causing the mass to become rigid and to cause the driving and driven members to move synchronously, transmitting power at synchronous speed through the mass so treated to utilize the mass as an overload release and determining the overload factor to give release by the amount of such material carried by the driven member.

5. The method of transmitting power between a rotary driving member of constant speed type and a rotary driven member which comprises disposing a mass of finely divided solid material having an appreciable coefficient of internal friction with relation to the driven member so as to be carried rotationally thereby, moving the driving member in contact with the mass to create a drift and thereby gradually accelerating the mass and the driven member, generating sufficient centrifugal force due to movement of the mass to increase the internal resistance thereof due to such force to a value causing the mass to become rigid and to cause the driving and driven members to move synchronously, transmitting power at synchronous speed through the mass so treated to utilize the mass as an overload release and varying the force value at which release occurs by varying the amount of such material carried by the driven member.

6. A clutch comprising relatively rotatable coaxially mounted driving and driven members, the driving member comprising a blade having axially extending side surfaces and an axially extending outer surface, said blade being fixed radially, the driven member comprising a drum, said blade being positioned to rotate within said drum and the inner surface of the drum being spaced somewhat from the outer surface of the blade, a quantity of finely divided solid material partially filling said drum and of such nature as to form a mass having an appreciable coefficient of internal friction and of such nature as to collect in a drift in front of the blade on rotation thereof relative to the drum and to present increasing resistance to relative rotation due to centrifugal force caused by rotation, and said blade having an effective radial extent for contact with the drift measured from said outer surface inwardly less than the height of the drift formed.

7. A clutch comprising relatively rotatable coaxially mounted driving and driven members, the driven member comprising a drum, the driving member comprising a plurality of symmetrically disposed blades having power transmitting positions within said drum with axially extending driving surfaces and outer surfaces spaced somewhat from the inner surface of the drum, a quantity of finely divided solid material partially filling the drum and of such nature as to form a mass having an appreciable coefficient of internal friction and of such nature as to collect in drifts in front of the blades on rotation thereof due to centrifugal force caused by rotation and said blades having effective radial extents measured from said outer surface inwardly less than the heights of the drifts formed.

8. A clutch comprising relatively rotatable coaxially mounted driving and driven members, the driven member comprising a drum, the driving member comprising a plurality of symmetrically disposed blades having power transmitting positions within said drum with axially extending driving surfaces and outer surfaces spaced somewhat from the inner surface of the drum, a quantity of finely divided solid material partially filling the drum and of such nature as to form a mass having an appreciable coefficient of internal friction and of such nature as to collect in drifts in front of the blades on rotation thereof due to centrifugal force caused by rotation and said blades having effective radial extents measured from said outer surface inwardly less than the heights of the drifts formed, said drifts providing the sole path of power transmission through the clutch and acting to transmit power in synchronous drive relation.

9. A clutch comprising relatively rotatable coaxially mounted driving and driven members, the driven member comprising a drum, the driving member comprising a plurality of symmetrically disposed blades within the drum, each of said blades providing a driving surface having axial extent and adapted to form a drift of finely divided material in front of the blade on rotation thereof, a quantity of finely divided solid material partially filling the drum and of such nature as to form a mass having an appreciable coefficient of internal friction and of such nature as to collect in drifts in front of the blades on rotation thereof due to centrifugal force, said blades having effective radial extents measured from the drum radially inwardly less the heights of the drifts formed and the drifts providing the sole path of power transmission through the clutch and acting to transmit power in synchronous drive relation.

10. A clutch for transmitting power comprising coaxially mounted driving and driven members forming a chamber therebetween, the driven member comprising a drum, the driving member comprising a plurality of symmetrically disposed blades, each of said blades having operative positions transverse to the direction of rotation, a quantity of ferrous granules partially filling said chamber and of such nature as to collect in drifts in front of the blades on rotation thereof relative to the drum and to provide synchronous drive with the power transmitted through the ferrous granules, radially outward portions of said blades having edges close to the drum and said blades being recessed away from the drum nearer the axis of rotation to provide free passage for the ferrous granules past the blades at inward points to balance the material in the clutch while passage thereof is prevented at the outward portions of the blades.

11. A clutch for transmitting power comprising coaxially mounted driving and driven members forming a chamber therebetween, the driven member comprising a drum, the driving member comprising a plurality of symmetrically disposed blades, each of said blades having operative positions transverse to the direction of rotation, a quantity of ferrous granules partially filling said chamber and of such nature as to collect in drifts in front of the blades on rotation thereof relative to the drum and to provide synchronous drive with the power transmitted through the ferrous granules, radially outward portions of said blades having edges close to the drum and said blades being apertured nearer the axis of rotation to provide free passage for the ferrous granules past the blades at inward points to balance the material in the clutch while passage thereof is prevented at the outward portions of the blades.

12. In a clutching device, a drum shaped closed casing, a hub rotatably mounted in said casing, said hub having a rim portion tightly engaging the end walls of the casing so as to form a closed annular space between said rim portion and said casing, blades on the outer surface of said rim portion, apertures in said blades, and a powdered material contained in said annular space.

13. In a clutching device, a drum shaped casing, a hub rotatably mounted in said casing, packing between the hub and the end walls of the casing so as to form a closed annular chamber between said hub and said casing, blades on said hub in said chamber, apertures in said blades, and a finely divided dry material partially filling said annular space.

14. In a clutching device, a drum shaped casing, a hub rotatably mounted in said casing, packing between the hub and the end walls of the casing so as to form a closed annular chamber between said hub and said casing, blades on said hub in said chamber, apertures in said blades, and a finely divided dry material comprising ferrous balls of a relatively few thousandths of an inch in diameter partially filling said chamber.

15. In a clutching device, a drum shaped casing, a hub rotatably mounted in said casing, packing between the hub and the end walls of the casing so as to form a closed annular chamber between said hub and said casing, blades on said hub in said chamber, apertures in said blades, and a finely divided dry material comprising ferrous balls of a relatively few thousandths of an inch and a relatively small amount of graphite partially filling said chamber.

16. A clutch for transmitting power comprising a member providing a revoluble casing, a second member rotatably mounted in said casing, said members providing a closed chamber therebetween, said second member comprising a plurality of blades disposed in said chamber, and a quantity of finely divided solid material partially filling said chamber and of such nature as to collect in drifts in front of the blades on rotation thereof relative to the casing, radially outward portions of said blades having edges close to the casing, openings being provided within the chamber nearer than said edges to the axis of rotation to provide free passage for said material past the blades at points inward of said edges to balance the material in the clutch.

17. In a clutching device, a member providing a revoluble casing, a second member rotatably mounted in said casing, said members providing a closed chamber therebetween, and a quantity of finely divided solid material partially filling said chamber, said second member comprising means for forming said material into a plurality of drifts and including surface contacting said material of different axial extent at different distances from the axis of rotation with respect to the axial extent of the chamber at corresponding distances from the axis of rotation.

18. In a clutching device, a member providing a revoluble casing, a second member rotatably mounted in said casing, said members providing a closed chamber therebetween, and a quantity of finely divided solid material partially filling said chamber, one of said members comprising means for forming said material into a plurality of drifts and said means having surface contacting said material of different axial extent at different distances from the axis of rotation.

19. In a clutching device, a member providing a revoluble casing, a second member rotatably mounted in said casing, said members providing a closed chamber therebetween, and a quantity of finely divided solid material partially filling said chamber, one of said members comprising blades having surfaces contacting said material for forming said material into a plurality of drifts upon rotation thereof in either direction, said surfaces having different axial extent at different distances from the axis of rotation with respect to the axial extent of the chamber at corresponding distances from the axis of rotation.

20. A clutch of the character described comprising a revoluble casing, a member rotatably mounted in said casing and forming therewith a closed chamber, and a quantity of finely divided solid material partially filling said chamber, said member comprising a central portion, radially outer portions contacting said material and extending generally axially of the major portion of the axial length of said chamber and radially intermediate portions contacting said material and having less axial extent than said radially outer portions with respect to the axial extent of the chamber at corresponding radial distances from the axis of rotation.

21. A clutch of the character described comprising a revoluble casing, a member rotatably mounted in said casing and forming therewith a closed chamber, and a quantity of finely divided solid material partially filling said chamber, said member comprising a central portion, radially outer portions contacting said material and extending generally axially of the major portion of the axial length of said chamber and radially intermediate portions contacting said material and having less axial extent than said radially outer portions.

22. In a clutching device, a revoluble casing, a hub rotatably mounted in said casing, said hub comprising axially spaced radially extending flange portions, packing between the hub and the casing so as to form a closed annular chamber between said hub and said casing, a quantity of finely divided solid material partially filling said chamber, and blades in said chamber, said blades being connected by axially spaced arms extending radially inwardly from the blades and joining said flange portions of the hub, whereby apertures are provided radially inside the blades to provide free passage for said material past the blades at points radially inside the blades.

23. In a clutching device, a revoluble casing, a hub rotatably mounted in said casing, said hub comprising axially spaced radially extending flanges, packing between the axially outer faces of said flanges and the end walls of the casing so as to form a closed annular chamber between said hub and said casing, blades on said hub in said chamber, the space between said flanges providing apertures for passage of material past said blades, and a finely divided solid material partially filling said chamber.

24. A clutch of the character described comprising a revoluble casing providing a chamber, a quantity of finely divided solid material partially filling said chamber, and means comprising blades in said chamber having surfaces contacting said material and of axial extent formed with respect to the casing to build and to equalize said material into drifts for transmitting power at synchronous speed between the casing and the blades upon rotation, the quantity of said finely divided material being predetermined in accordance with the maximum force to be transmitted through the clutch at given speed whereby to provide overload release of the clutch upon application of overload force of fixed value.

25. A clutch of the character described comprising a revoluble casing providing a chamber, a quantity of finely divided solid material comprising metal balls of relatively few thousandths of an inch in diameter partially filling said chamber, and means comprising blades in said chamber having surfaces contacting said material and of axial extent formed with respect to said casing to build and to equalize said material into drifts for transmitting power at synchronous speed between the casing and the blades upon rotation, the quantity of said finely divided material being predetermined in accordance with the maximum force to be transmitted through the clutch at given speed whereby to provide overload release of the clutch upon application of overload force of fixed value.

26. A clutch comprising relatively rotatable coaxially mounted driving and driven members, the driving member comprising a blade having axially extending side surfaces, an axially extending outer surface and end surfaces, the driven member comprising a drum having a cylindrical portion and end portions, said blade being positioned to rotate within said drum and extending radially outward so that the outer surface of the blade is near the cylindrical portion of the drum and extending axially so that the end surfaces of the blade are near the end portions of the drum, said blade being axially symmetrical and being symmetrically apertured inwardly from the outer surface thereof, and a quantity of finely divided solid material partially filling the space between the driving and driven members, the forward axially extending side surface of the blade with respect to the direction of rotation being shaped to form a drift of the finely divided material.

27. A clutch comprising relatively rotatable coaxially mounted driving and driven members, the driving member comprising a blade having axially extending side surfaces, an axially extending outer surface and end surfaces, the driven member comprising a drum having a cylindrical portion and end portions, said blade being positioned to rotate within said drum and extending radially outward so that the outer surface of the blade is near the cylindrical portion of the drum and extending axially so that the end surfaces of the blade are near the end portions of the drum, said blade being axially symmetrical and being symmetrically apertured inwardly from the outer surface thereof, and a quantity of finely divided solid material partially filling the space between the driving and driven members, the inside surface of the cylindrical portion of the drum being serrated, and the forward axially extending side surface of the blade with respect to the direction of rotation being shaped to form a drift of the finely divided material.

28. A clutch comprising relatively rotatable coaxially mounted driving and driven members, the driving member comprising a hub and a plurality of symmetrically disposed blades extending outwardly from the hub, each blade having axially extending side surfaces, an axially extending outer surface and end surfaces, the driven member comprising a drum having a cylindrical portion and end portions, said blades being positioned to rotate within said drum and extending radially outward so that the outer surfaces of the blades are near the cylindrical portion of the drum and extending axially so that the end surfaces of the blades are near the end portions of the drum, said blades being axially symmetrical and having symmetrical apertures inwardly from the outer surface thereof, and a quantity of finely divided solid material partially filling the space between the driving and driven members, said apertures serving to permit equalization of distribution of the finely divided material at radially inward points to balance the clutch, and the axially extending side surfaces of the blades being shaped to form drifts of the finely divided material.

29. A clutch comprising relatively rotatable coaxially mounted driving and driven members, the driving member comprising a hub and a plurality of symmetrically disposed blades extending outwardly from the hub, each blade having axially extending side surfaces, an axially extending outer surface and end surfaces, the driven member comprising a drum having a cylindrical portion and end portions, said blades being positioned to rotate within said drum and extending radially outward so that the outer surfaces of the blades are near the cylindrical portion of the drum and extending axially so that the end surfaces of the blades are near the end portions of the drum, said blades being axially symmetrical and having symmetrical apertures inwardly from the outer surface thereof, and a quantity of finely divided solid material partially filling the space between the driving and driven members, said apertures serving to permit equalization of distribution of the finely divided material at radially inward points to balance the clutch, the inside surface of the cylindrical portion of the drum being serrated, and the axially extending side surfaces of the blades being shaped to form drifts of the finely divided material.

30. A clutch comprising relatively rotatable coaxially mounted driving and driven members, the driving member comprising a hub and a plurality of symmetrically disposed blades extending outwardly from the hub, each blade having outwardly tapering axially extending side surfaces, an axially extending outer surface and end surfaces, the driven member comprising a drum having a cylindrical portion and end portions, said blades being positioned to rotate within said drum and extending radially outward so that the outer surfaces of the blades are near the cylindrical portion of the drum and extending axially so that the end surfaces of the blades are near the end portions of the drum, said blades being axially symmetrical and having symmetrical apertures inwardly from the outer surface thereof, and a quantity of finely divided solid material partially filling the space between the driving and driven members, said apertures serving to permit equalization of distribution of the finely divided material at radially inward points to balance the clutch.

31. A clutch comprising relatively rotatable coaxially mounted driving and driven members, the driving member comprising a hub and a plurality of symmetrically disposed blades extending outwardly from the hub, each blade having outwardly tapering axially extending side surfaces, an axially extending outer surface and end surfaces, the driven member comprising a drum having a cylindrical portion and end portions, said blades being positioned to rotate within said drum and extending radially outward so that the outer surfaces of the blades are near the cylindrical portion of the drum and extending axially so that the end surfaces of the blades are near the end portions of the drum, said blades being axially symmetrical and having symmetrical apertures inwardly from the outer surface thereof, and a quantity of finely divided solid material partially filling the space between the driving and driven members, said apertures serving to permit equalization of distribution of the finely divided material at radially inward points to balance the clutch, the inside surfaces of the cylindrical portion of the drum being serrated.

32. A clutch comprising relatively rotatable coaxially mounted driving and driven members, the driving member comprising a blade having an axially extending driving surface, an outer surface and end surfaces, the driven member comprising a drum having a peripheral portion and end portions, said blade being positioned to rotate within said drum and extending radially outward so that the outer surface of the blade is near the peripheral portion of the drum and extending axially so that the end surfaces of the blade are near the end portions of the drum, said blade being axially symmetrical and being formed radially inwardly from the outer surface thereof to have less axial extent than the axial extent at the same radial distance between the end portions of the drum, and a quantity of finely divided solid material partially filling the space between the driving and driven members, the driving surface of the blade being shaped to form a drift of the finely divided material, and the difference in axial extent between the blade and the space within the drum serving to permit equalization of distribution of the finely divided material to balance the clutch.

33. That improvement in the art of power transmission which consists in building up a plurality of drifts of finely divided solid material, subjecting the drifts to sufficient centrifugal force to convert the drifts into fixed acting masses due to such force, equalizing the quantities of material forming the fixed acting masses, and transmitting power through the fixed acting masses.

34. That improvement in the art of power transmission which consists in building up a plurality of drifts of finely divided solid material, subjecting the drifts to sufficient centrifugal force to convert the drifts into fixed acting masses due to such force, equalizing the quantities of material forming the fixed acting masses, transmitting power through the fixed acting masses, and utilizing the drifts as yieldable members for overload release.

35. That improvement in the art of power transmission from the driving member to a driven member which consists in building up a plurality of drifts of finely divided solid material, subjecting the drifts to sufficient centrifugal force to convert the drifts into fixed acting masses due to such force, equalizing the quantities of material forming the fixed acting masses, transmitting power from the driving member to the driven member at synchronous speed solely through said fixed acting masses, and utilizing the drifts as yieldable members for overload release.

36. In a clutching device, a blade wheel comprising axially extending blades, a revoluble closed casing surrounding said blade wheel, serrations on the inner surface of said casing, and powdered material partially filling said casing and adapted to form in drifts in the casing, said blades having different axial extent at different distances from the axis of rotation with respect to the axial extent of the chamber at corresponding distances from the axis of rotation whereby to permit uniform distribution of said material in said casing during the operation thereof to balance the device.

In witness whereof I have hereunto affixed my signature.

CARL AUGUST RUDQVIST.